(12) United States Patent
Yan et al.

(10) Patent No.: US 12,109,776 B2
(45) Date of Patent: Oct. 8, 2024

(54) HIGH CORROSION-RESISTANCE STRIP STEEL AND MANUFACTURING METHOD THEREFOR

(71) Applicant: BAOSHAN IRON & STEEL CO., LTD., Shanghai (CN)

(72) Inventors: Bo Yan, Shanghai (CN); Sihai Jiao, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 0 days.

(21) Appl. No.: 17/790,590

(22) PCT Filed: Jan. 12, 2021

(86) PCT No.: PCT/CN2021/071186
§ 371 (c)(1),
(2) Date: Jul. 1, 2022

(87) PCT Pub. No.: WO2021/143661
PCT Pub. Date: Jul. 22, 2021

(65) Prior Publication Data
US 2022/0396054 A1 Dec. 15, 2022

(30) Foreign Application Priority Data
Jan. 13, 2020 (CN) .......................... 202010031109.7

(51) Int. Cl.
*C22C 38/00* (2006.01)
*B21B 1/22* (2006.01)
(Continued)

(52) U.S. Cl.
CPC ............. *B32B 15/011* (2013.01); *B21B 1/22* (2013.01); *B32B 15/013* (2013.01); *C22C 38/02* (2013.01);
(Continued)

(58) Field of Classification Search
None
See application file for complete search history.

(56) References Cited

U.S. PATENT DOCUMENTS

2018/0229476 A1* 8/2018 Unno .................. C21D 8/0257
2019/0344315 A1 11/2019 Yan et al.

FOREIGN PATENT DOCUMENTS

| CN | 108085585 A | 5/2018 |
| CN | 108580555 A | 9/2018 |

(Continued)

OTHER PUBLICATIONS

International Search Report for PCT/CN2021/071186 darted Mar. 31, 2021.
International Written Opinion for PCT/CN2021/071186 dated Mar. 31, 2021.
The extended European search report dated Sep. 22, 2022 for EP App. No. 21741882.1.

*Primary Examiner* — Kim S. Horger
(74) *Attorney, Agent, or Firm* — Lei Fang, Esq.; Smith Tempel Blaha LLC

(57) ABSTRACT

Disclosed is a high corrosion-resistance strip steel and its manufacturing method. The high corrosion-resistance strip steel comprises a carbon steel base layer and a corrosion-resistance cladding layer roll-bonded with the carbon steel base layer, the corrosion-resistance cladding layer being austenitic stainless steel or pure titanium, the thickness of the corrosion-resistance cladding layer being 0.5% to 5% of the total thickness of the strip steel. The high corrosion-resistance strip steel has a high corrosion-resistance surface, good interlayer bonding performance, good mechanical properties and processability.

17 Claims, 3 Drawing Sheets

(51) Int. Cl.
*B32B 15/01* (2006.01)
*C22C 38/02* (2006.01)
*C22C 38/04* (2006.01)
*C22C 38/06* (2006.01)
*C22C 38/12* (2006.01)
*C22C 38/14* (2006.01)

(52) U.S. Cl.
CPC .............. *C22C 38/04* (2013.01); *C22C 38/06* (2013.01); *C22C 38/12* (2013.01); *C22C 38/14* (2013.01); *B32B 2250/02* (2013.01); *B32B 2307/732* (2013.01); *B32B 2311/18* (2013.01); *B32B 2311/30* (2013.01)

(56) References Cited

FOREIGN PATENT DOCUMENTS

| | | | |
|---|---|---|---|
| CN | 109108071 A | | 1/2019 |
| CN | 109306436 A | | 2/2019 |
| CN | 109695000 A | | 4/2019 |
| CN | 110499453 A | | 11/2019 |
| EP | 3546611 A1 | | 10/2019 |
| JP | S56122681 A | | 9/1981 |
| JP | H06207249 A | * | 1/1993 |
| JP | H06235050 A | | 8/1994 |
| JP | 2016108665 A | | 6/2016 |

* cited by examiner

HIGH CORROSION-RESISTANCE STRIP STEEL AND MANUFACTURING METHOD THEREFOR

CROSS-REFERENCE TO RELATED APPLICATIONS

This application is a 371 U.S. National Phase of PCT International Application No. PCT/CN2021/071186 filed on Jan. 12, 2021, which claims benefit and priority to Chinese patent application No. CN202010031109.7 filed on Jan. 13, 2021, the contents of each of the above listed applications are incorporated by reference herein in their entireties.

TECHNICAL FIELD

The present disclosure relates to a steel and a manufacturing method thereof, in particular to a corrosion-resistant strip steel and a manufacturing method thereof.

BACKGROUND ART

In the prior art, in addition to plating zinc or zinc alloy on the surface of a steel plate product to improve its corrosion resistance, there is another way to increase the corrosion resistance of carbon steel, that is, a roll bonding process where a high-corrosion-resistant layer is formed on the surface of the carbon steel plate. In this process, a plating step is not required after rolling. Moreover, the corrosion resistance of the high-corrosion-resistant layer is much higher than that of a zinc layer obtained by a galvanizing process. The reason is that the high-corrosion-resistant layer obtained by roll bonding is metallurgically bonded to the carbon steel. Thus, the strength and processability of the steel plate can be guaranteed, and the corrosion resistance is good. So, the purpose of product upgrading is achieved. However, in the prior art, the roll bonding process is limited by the thickness of the high-corrosion-resistant layer. If the thickness of the high-corrosion-resistant layer is to be further reduced, the difficulty in blank assembly, heating and rolling is increased sharply, and there is no successful precedent in the industry.

It's extremely difficult to obtain a high-corrosion-resistant layer having a thickness that is 5% or less of the thickness of a steel plate or steel strip. The difficulties mainly include:

(1) The proportion of the high-corrosion-resistant layer differs greatly from the proportion of the carbon steel plate serving as the matrix metal. Generally, the ratio of the high-corrosion-resistant layer to the carbon steel plate exceeds 1:50. As a result, the properties of the material vary gigantically, so that the heating process, the rolling process or the heat treatment process is difficult to control. The following difficulties may be mentioned in particular. For example, in the heating process, the temperature is not uniform, leading to deformation and bulges, so that the high-corrosion-resistant layer fails to bond with the matrix metal. For another instance, in the rolling process, the high-corrosion-resistant layer tends to separate from the matrix metal and crack, so that the uniformity of the thickness of the final steel plate cannot be guaranteed.

(2) For hot-rolled strip steel having a total thickness of 0.2-2 mm, the thickness of the high-corrosion-resistant layer is only 20-100 μm. If the upstream compounding is not fully accomplished and thus the bonding quality is poor, the continuity and uniformity of the corrosion-resistant layer of the finished product cannot be guaranteed after subsequent processes such as acid pickling, forming and the like, and there will be a great trouble in later use.

(3) In some steel plates where the carbon content in the carbon steel plate layer is relatively high, if there is no stabilizing element, a decarburization layer exists apparently on one side of the carbon steel plate where the high-corrosion-resistant layer bonds with the carbon steel plate layer at an interface. As a result, the substrate structure of the carbon steel plate layer is not uniform, and surface defects are prone to be generated after processing, so that the mechanical properties of the final product are also difficult to meet requirements.

In view of the above, it's desirable to provide a high-corrosion-resistant strip steel, wherein the final steel plate or steel strip obtained by appropriate compositional design, thickness design and process design for the high-corrosion-resistant strip steel has a high-corrosion-resistant surface and good interlayer bonding, and the steel plate or steel strip has superior mechanical properties and good processability.

SUMMARY

One of the objects of the present disclosure is to provide a high-corrosion-resistant strip steel. By designing the composition, thickness and process for the high-corrosion-resistant strip steel reasonably, a final steel plate or steel strip obtained therefrom has a high-corrosion-resistant surface and good interlayer bonding, and the steel plate or steel strip exhibits excellent mechanical properties and good processability as well.

In order to achieve the above object, the present disclosure proposes a high-corrosion-resistant strip steel comprising a carbon steel base layer and a corrosion-resistant cladding layer roll-bonded to the carbon steel base layer, wherein the corrosion-resistant cladding layer is austenitic stainless steel or pure titanium, and the corrosion-resistant cladding layer has a thickness that is 0.5-5% of the total thickness of the strip steel.

In the high-corrosion-resistant strip steel according to the present disclosure, the thickness of the corrosion-resistant cladding layer is critical to the properties of the final strip steel product. If the thickness of the corrosion-resistant cladding layer is too large, the mechanical properties of the strip steel product will be affected, and the cost will be increased. If the thickness of the corrosion-resistant cladding layer is too small, the corrosion resistance and the service life of the high-corrosion-resistant strip steel will be reduced. In view of this, in the technical solution according to the present disclosure, the thickness of the corrosion-resistant cladding layer is controlled at 0.5-5% of the total thickness of the strip steel.

It should be noted that the corrosion-resistant cladding layer according to the present disclosure is an ultra-thin corrosion-resistant cladding layer, and the thickness thereof is only 0.5-5% of the total thickness of the strip steel, which is much thinner than the thickness of the conventional cladding layer in the prior art.

In addition, it should be noted that the austenitic stainless steel or pure titanium used for the corrosion-resistant cladding layer only needs to meet the national or international standards. The austenitic stainless steel or pure titanium of different corrosion resistance levels may be selected according to the working conditions. For example, 304, 304 L, 316, and 316L may be used as the austenitic stainless steel, and TA2 may be used as the pure titanium.

In addition, considering that the final strip steel product needs high mechanical properties, a carbon steel base layer that has high strength and can ensure better processability may be used.

Further, in the high-corrosion-resistant strip steel according to the present disclosure, the carbon steel base layer comprises chemical elements in percentage by mass of:
C: 0.01-0.20%;
Si: 0.10-0.5%;
Mn: 0.5-2.0%;
Al: 0.02-0.04%;
Ti: 0.005-0.018%;
Nb: 0.005-0.020%; and
a balance of Fe and other unavoidable impurities.

Further, in the high-corrosion-resistant strip steel according to the present disclosure, amounts of C, Si, Mn, Al, Ti and Nb meet at least one of:
C: 0.01-0.18%;
Si: 0.10-0.3%;
Mn: 0.5-1.5%;
Al: 0.02-0.03%;
Ti: 0.005-0.015%;
Nb: 0.005-0.015%.

In the above technical solution, the principle for designing each chemical element of the carbon steel base layer is as follows:

C: In the technical solution according to the present disclosure, C is an austenite stabilizing element. It has a solid solution strengthening effect in the steel, and can improve the steel strength significantly. However, an unduly high mass percentage of C is disadvantageous to the welding performance and toughness, and also tends to increase hard-phase structures such as a pearlite structure and martensite-austenite islands, which have a negative impact on the corrosion resistance of the steel. Therefore, in view of the strength-toughness matching of the steel plate and the required corrosion resistance of the carbon steel material, the mass percentage of C may be controlled at 0.01 to 0.20%. This helps to ensure that certain hardness and strength can be obtained when the high-corrosion-resistant strip steel according to the present disclosure is air cooled after rolling. However, the mass percentage of C cannot be too high; otherwise, the welding performance of the carbon steel base layer may be degraded, especially in the present disclosure, because the thickness of the corrosion-resistant cladding layer in the present disclosure is 0.5-5% of the total thickness of the strip steel. Therefore, the mass percentage of C needs to be controlled within the above range to avoid the adverse influence on welding performance. Of course, in some preferred embodiments, the mass percentage of C may be further controlled at 0.01-0.18%. In some preferred embodiments, the mass percentage of C is further controlled at 0.10-0.20%, more preferably 0.10-0.18%

Si: In the technical solution according to the present disclosure, Si in the steel can increase the steel purity and play a role in deoxygenation. Si has a solid solution strengthening effect in the steel, but an excessively high mass percentage of Si is disadvantageous to welding performance. Therefore, in the high-corrosion-resistant strip steel according to the present disclosure, the mass percentage of Si may be controlled at 0.10-0.5%, so that the corrosion resistance of the corrosion-resistant cladding layer will not be adversely affected, and the carbon steel base layer can be ensured to have good welding performance. In some preferred embodiments, the mass percentage of Si may be further controlled at 0.10-0.3%. In some preferred embodiments, the mass percentage of Si is 0.15-0.35%.

Mn: For the high-corrosion-resistant strip steel according to the present disclosure, Mn can delay the transition of pearlite, reduce the critical cooling speed, improve the hardenability of the steel, and have a solid solution strengthening effect on the steel. It is one of the main solid solution strengthening elements in the steel. However, if the mass percentage of Mn is too high, a segregated band and a martensite structure are prone to occur, and the toughness of the steel will be adversely affected. In addition, the presence of the segregated band may further decrease the corrosion resistance of the steel. Therefore, in the technical solution according to the present disclosure, the mass percentage of Mn is controlled at 0.5-2.0%. In some preferred embodiments, the mass percentage of Mn may be further controlled at 0.5-1.5%.

Al: In the high-corrosion-resistant strip steel according to the present disclosure, Al is a strong deoxygenation element. In order to ensure that the oxygen content in the steel is as low as possible, the mass percentage of Al is controlled at 0.02-0.04% in the technical solution according to the present disclosure. The excess Al left after deoxygenation and the nitrogen element in the steel can form an MN precipitate, thereby increasing the strength of the final strip steel product and refining the prior austenite grains in the steel during heat treatment. In some preferred embodiments, the mass percentage of Al may be further controlled at 0.02-0.03%.

Ti: For the high-corrosion-resistant strip steel according to the present disclosure, Ti is a strong carbide forming element. The addition of a trace amount of Ti to the steel is conducive to the fixing of N in the steel. The resulting TiN in the carbon steel base layer can prevent excessive growth of austenite grains in the matrix when a blank of the high-corrosion-resistant strip steel is heated, and refine the prior austenite grains. In addition, Ti may also combine with carbon and sulfur in the steel to form TiC, TiS, and $Ti_4C_2S_2$, respectively, in the form of inclusions and second phase particles. The abovementioned carbon nitride precipitate of Ti can also prevent grain growth in the heat affected zone during welding, so that the welding performance is improved. Therefore, in the technical solution according to the present disclosure, the mass percentage of Ti is controlled at 0.005-0.018%. In some preferred embodiments, the mass percentage of Ti may be further controlled at 0.005-0.015%.

Nb: For the high-corrosion-resistant strip steel according to the present disclosure, Nb is a strong carbide forming element. A small amount of Nb is added into the carbon steel base layer mainly for increasing the recrystallization temperature to adapt to the high finish rolling temperature, so that grains in the high-corrosion-resistant strip steel according to the present disclosure can be refined after rolling in the recrystallization and subrecrystallization zones is completed. This is conducive to improvement of the low-temperature impact toughness of the carbon steel base layer. Therefore, in the technical solution according to the present disclosure, the mass percentage of Nb is controlled at 0.005-0.020%. In some preferred embodiments, the mass percentage of Nb may be further controlled at 0.005-0.015%.

Further, the high-corrosion-resistant strip steel according to the present disclosure further comprises at least one of the following chemical elements: $0<B\le0.0003\%$; $0<N\le0.006\%$; $0<Ni\le0.20\%$; $0<Cr\le0.20\%$; $0<Mo\le0.10\%$; $0<Sb\le0.30\%$; $0<V\le0.30\%$; $0<W\le0.30\%$; $0<Cu\le0.30\%$; $0<Sn\le0.30\%$; $0<Bi\le0.30\%$; $0<Se\le0.30\%$; $0<Te\le0.30\%$; $0<Ge\le0.30\%$; $0<As\le0.30\%$; $0<Ca\le0.30\%$; $0<Mg\le0.30\%$; $0<Zr\le0.30\%$; $0<Hf\le0.30\%$; $0<$rare earth elements$\le0.50\%$.

Among the above-mentioned elements, for example, B may function as follows: B can improve the hardenability of the steel greatly. In the case where air cooling is performed after rolling, in order to obtain a better microstructure, for example, to obtain a ferrite+pearlite structure exclusively, and inhibit formation of bainite, the mass percentage of B to be added may be defined as 0<B≤0.0003% for the high-corrosion-resistant strip steel comprising a corrosion-resistant cladding layer having a thickness that is 0.5%-5% of the total thickness of the high-corrosion-resistant strip steel according to the present disclosure.

In respect of Ni, Ni is an austenite stabilizing element, and has a certain effect in improving strength. The addition of Ni into the steel, especially into the tempered steel, can improve the low-temperature impact toughness of the steel greatly. Therefore, in the technical solution according to the present disclosure, the mass percentage of Ni to be added may be defined as 0<Ni≤0.20%. In some embodiments, the mass percentage of Nb to be added is 0<Ni≤0.10%.

In respect of Cr, Cr is less prone to segregation than Mn. When the mass percentage of Mn in the carbon steel base layer is so high that a segregated band and a banded structure are noticeably observable in the steel, the mass percentage of Mn can be reduced appropriately, and Cr may be added. In addition, the addition of Cr into the carbon steel base layer also helps to suppress diffusion of Cr from the corrosion-resistant cladding layer to the carbon steel base layer. Therefore, in the technical solution according to the present disclosure, the mass percentage of Cr to be added may be defined as: 0<Cr≤0.20%.

In respect of Mo, Mo can refine grains, and improve strength and toughness significantly. Mo can reduce temper brittleness of the steel, and also allow for precipitation of very fine carbides during tempering, thereby strengthening the steel matrix significantly. The addition of Mo helps to suppress self-temper brittleness that is ready to be generated during air cooling of the steel plate. Therefore, in the technical solution according to the present disclosure, the mass percentage of Mo to be added may be defined as: 0<Mo≤0.10%.

Further, in the high-corrosion-resistant strip steel according to the present disclosure, among the other unavoidable impurities: P≤0.015%; and/or S≤0.010%.

In the technical solution according to the present disclosure, S in the steel combines with Mn to form a plastic inclusion MnS which adversely affects the transverse plasticity and toughness of the steel. Therefore, the mass percentage of S should be as low as possible. P in the steel is also a detrimental element which seriously impairs the plasticity and toughness of the steel plate. Therefore, the mass percentages of P and S need to be controlled as low as possible. With the practical steelmaking level of steel mills taken into consideration, it's defined that P≤0.015% and/or S≤0.010%.

In some embodiments according to the present disclosure, the carbon steel base layer in the high-corrosion-resistant strip steel according to the present disclosure comprises chemical elements in percentage by mass of: C: 0.01-0.20%, preferably 0.01-0.18%, more preferably 0.10-0.18%; Si: 0.10-0.5%, preferably 0.10-0.3% or 0.15-0.35%; Mn: 0.5-2.0%, preferably 0.5-1.5%; Al: 0.02-0.04%, preferably 0.02-0.03%; Ti: 0.005-0.018%, preferably 0.005-0.015%; Nb: 0.005-0.020%, preferably 0.005-0.015%; N: 0<N≤0.006%, preferably 0.0035-0.0055%; Mo: ≤0.10%; Cr: ≤0.20%; Ni: ≤0.20%, preferably ≤0.10%; and a balance of Fe and other unavoidable impurities. Further, in the high-corrosion-resistant strip steel according to the present disclosure, the microstructure of the carbon steel base layer is ferrite and pearlite, the microstructure of the austenitic stainless steel corrosion-resistant cladding layer is austenite, and the transition layer between the carbon steel base layer and the corrosion-resistant cladding layer is pearlite and ferrite.

Further, the high-corrosion-resistant strip steel according to the present disclosure has a tensile strength of ≥500 MPa, preferably ≥530 MPa, a yield strength of 370-510 MPa, and an elongation of ≥30%.

Further, the high-corrosion-resistant strip steel according to the present disclosure has a tensile strength of ≥600 MPa, a yield strength of 470-510 MPa, and an elongation of ≥35%. In some embodiments, the high-corrosion-resistant strip steel according to the present disclosure has a tensile strength of 600-650 MPa, a yield strength of 470-510 MPa, and an elongation of 35-40%.

Further, the high-corrosion-resistant strip steel according to the present disclosure is a hot-rolled strip steel or a cold-rolled strip steel.

Accordingly, another object of the present disclosure is to provide a manufacturing method for a high-corrosion-resistant strip steel, by which the high-corrosion-resistant strip steel can be obtained.

To fulfil the above object, the present disclosure proposes a manufacturing method for a high-corrosion-resistant strip steel, comprising steps:

(1) Providing a carbon steel base layer as a base material and a corrosion-resistant cladding layer as a cladding material;

(2) Assembling a slab;

(3) Pre-heating: pre-heating the slab at a temperature of 1150-1250° C. to diffuse elements of the corrosion-resistant cladding layer and the carbon steel base layer at an interface to form a stable transition layer, and then slowly cooling to room temperature;

(4) Secondary heating and rolling: performing secondary heating at a temperature of 1100-1200° C., and then performing multi-pass rolling, wherein a finish rolling temperature is controlled to be not lower than 900° C.;

(5) Coiling after water cooling.

In the technical solution according to the present disclosure, the pre-heating may allow the corrosion-resistant cladding layer at the surface of the slab to obtain a uniform austenite structure, so that the carbides that possibly exist originally are completely dissolved. In addition, the pre-heating may allow the compounds of the alloy elements in the carbon steel base layer to be dissolved completely or partially, so that the elements of the corrosion-resistant cladding layer and the carbon steel base layer diffuse at the interface to form a stable transition layer which is then slowly cooled to room temperature.

Further, in the manufacturing method according to the present disclosure, in step (1), each layer of cladding material has a thickness of 5-20 mm, preferably 8-15 mm.

Further, in the manufacturing method according to the present disclosure, in step (1), the base material has a thickness of 300-370 mm.

Further, in the manufacturing method according to the present disclosure, in step (4), a total rolling reduction ratio is controlled to be not lower than 70%. In some embodiments, the total rolling reduction ratio is not lower than 90%.

Further, in the manufacturing method according to the present disclosure, in step (4), the finish rolling temperature is controlled to be 920-1000° C.

Further, in the manufacturing method according to the present disclosure, in step (5), a coiling temperature is controlled to be 500-650° C., preferably 550-650° C.

Further, in the manufacturing method according to the present disclosure, after step (5), the method further comprises: a surface treatment step or a cold rolling step.

It should be noted that the surface treatment step comprises acid pickling or mechanical descaling.

Further, in the cold rolling step, a cold rolling annealing temperature is controlled to be 600-750° C.

Compared with the prior art, the high-corrosion-resistant strip steel and the manufacturing method thereof have the following advantages and beneficial effects:

The high-corrosion-resistant strip steel according to the present disclosure is provided with a corrosion-resistant cladding layer and a carbon steel base layer having proper thicknesses, so that a strip having high corrosion resistance and good mechanical properties is obtained.

In some embodiments, a transition layer structure of a certain thickness is formed between the corrosion-resistant cladding layer and the carbon steel base layer, so that complete metallurgical bonding of the corrosion-resistant cladding layer and the carbon steel base layer is achieved extremely well. While the corrosion resistance and the mechanical properties are guaranteed, the applicability and economy of the material are promoted. The essential sore point with the existing carbon steel materials can be addressed. The corrosion resistance, bonding strength and durability achieved according to the present disclosure are not possible for the existing coated plate products. The high-corrosion-resistant strip steel according to the present disclosure is more energy-saving, environment-friendly and maintenance-free, and has important significance and promising prospects.

The present disclosure also proposes a high-corrosion-resistant strip steel prepared by the method of any of the embodiments according to the present disclosure. The corrosion resistance of the high-corrosion-resistant strip steel according to the present disclosure can reach the corrosion resistance of the material used for the cladding material.

In addition, the manufacturing method according to the present disclosure also has the above advantages and beneficial effects.

DETAILED DESCRIPTION

Figure 1:
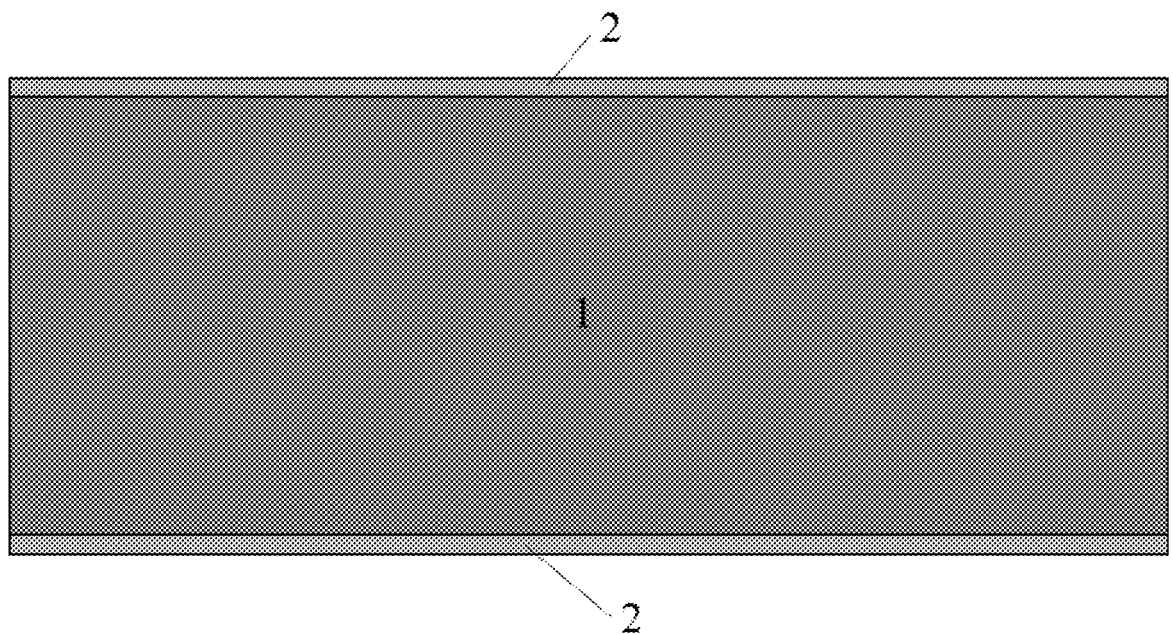
FIG. 1 schematically shows the structure of the high-corrosion-resistant strip steel according to the present disclosure in some embodiments.

The high corrosion resistant strip steel according to the present disclosure and the method for manufacturing the same will be further explained and illustrated with reference to the accompanying drawing of the specification and the specific examples. Nonetheless, the explanation and illustration are not intended to unduly limit the technical solution of the present disclosure.

Examples 1-6

The following steps were employed to prepare the high corrosion resistant strip steel in Examples 1-6:
(1) Providing a base material and a cladding material. The chemical compositions of the base material and the cladding material are listed in Table 1.
(2) Assembling a slab: When the slab was assembled, the thickness of the high-corrosion-resistant strip steel was 0.5%-5% of the total thickness of the slab. In some embodiments, prior to the assembling, the base material and the cladding material were pre-treated. Then, the faying surfaces of the base material and the cladding material were sealed by welding around the periphery, and the joined surfaces were vacuumized after the sealing by welding.
(3) Pre-heating: The slab was pre-heated at a temperature of 1150-1250° C. to diffuse elements of the corrosion-resistant cladding layer and the carbon steel base layer at the interface to form a stable transition layer, and then slowly cooled to room temperature.
(4) Secondary heating and rolling: Secondary heating was performed at a temperature of 1100-1200° C., and then multi-pass rolling was performed. The finish rolling temperature was controlled to be not lower than 900° C.
(5) Coiling after water cooling.

In some embodiments, in step (4), the total rolling reduction ratio was not lower than 70%.

In some embodiments, in step (4), the finish rolling temperature was controlled to be 920-1000° C.

In some embodiments, in step (5), the coiling temperature was controlled to be 500-650° C.

It should be noted that, in some embodiments, after step (5), the hot-rolled high-corrosion-resistant strip steel coil was subjected to surface treatment, including acid pickling or mechanical descaling.

In some other embodiments, after step (5), cold rolling annealing was also performed to obtain a cold-rolled high-corrosion-resistant strip steel coil.

Table 1 lists the mass percentages of the various chemical elements in the high-corrosion-resistant strip steel of Examples 1-6.

TABLE 1

| | | | | | | | | | | Other | |
|---|---|---|---|---|---|---|---|---|---|---|---|
| | Corrosion resistant cladding layer Carbon steel | | | | | | | | | preferably addible | |
| Ex. | base layer | C | Si | Mn | P | S | Al | Ti | Nb | elements | N |
| 1 | Corrosion resistant cladding layer | 304L used for the corrosion resistant cladding layer, meeting GB/T 20878-2007 or the corresponding standards in other countries | | | | | | | | | |

TABLE 1-continued (wt %, the balance is Fe and other unavoidable impurities except for P and S)

| Ex. | Corrosion resistant cladding layer Carbon steel base layer | C | Si | Mn | P | S | Al | Ti | Nb | Other preferably addible elements | N |
|---|---|---|---|---|---|---|---|---|---|---|---|
| | Carbon steel base layer | 0.10 | 0.35 | 1.50 | 0.010 | 0.005 | 0.040 | 0.018 | 0.020 | Mo: 0.10 | 0.0045 |
| 2 | Corrosion resistant cladding layer | 304 used for the corrosion resistant cladding layer, meeting GB/T 20878-2007 or the corresponding standards in other countries | | | | | | | | | |
| | Carbon steel base layer | 0.14 | 0.25 | 1.00 | 0.010 | 0.005 | 0.030 | 0.014 | 0.011 | Cr: 0.20 | 0.0052 |
| 3 | Corrosion resistant cladding layer | 316L used for the corrosion resistant cladding layer, meeting GB/T 20878-2007 or the corresponding standards in other countries | | | | | | | | | |
| | Carbon steel base layer | 0.20 | 0.15 | 0.50 | 0.008 | 0.004 | 0.020 | 0.005 | 0.005 | — | 0.0040 |
| 4 | Corrosion resistant cladding layer | 316 used for the corrosion resistant cladding layer, meeting GB/T 20878-2007 or the corresponding standards in other countries | | | | | | | | | |
| | Carbon steel base layer | 0.11 | 0.30 | 1.48 | 0.008 | 0.005 | 0.026 | 0.008 | 0.005 | Ni: 0.10 | 0.0038 |
| 5 | Corrosion resistant cladding layer | 316 used for the corrosion resistant cladding layer, meeting GB/T 20878-2007 or the corresponding standards in other countries | | | | | | | | | |
| | Carbon steel base layer | 0.14 | 0.25 | 0.5 | 0.010 | 0.005 | 0.030 | 0.014 | 0.011 | Cr: 0.20 | 0.0052 |
| 6 | Corrosion resistant cladding layer | TA2 used for the corrosion resistant cladding layer, meeting GB/T 3621-2007 or the corresponding standards in other countries | | | | | | | | | |
| | Carbon steel base layer | 0.10 | 0.35 | 1.50 | 0.010 | 0.005 | 0.040 | 0.018 | 0.020 | Mo: 0.10 | 0.0045 |

Table 2 lists the specific process parameters for the high-corrosion-resistant strip steel of Examples 1-6.

In order to verify the implementation effects of the present disclosure and prove the excellent effects of the present

TABLE 2

| Ex. | Final product type | Assembly | Thickness of each layer of cladding material (mm) | Total slab thickness after assembling (mm) | Pre-heating temperature/ °C. | Heating temperature/ °C. | Final rolling temperature/ °C. |
|---|---|---|---|---|---|---|---|
| 1 | Cold-rolled plate | Cladding layer + base layer + cladding layer | 8 | 380 | 1160 | 1150 | 980 |
| 2 | Hot-rolled plate | Cladding layer + base layer | 8 | 325 | 1250 | 1160 | 1000 |
| 3 | Cold-rolled plate | Cladding layer + base layer + cladding layer | 10 | 380 | 1180 | 1140 | 990 |
| 4 | Cold-rolled plate | Cladding layer + base layer + cladding layer | 8 | 380 | 1200 | 1180 | 980 |
| 5 | Hot-rolled plate | Cladding layer + base layer | 8 | 325 | 1200 | 1160 | 1000 |
| 6 | Cold-rolled plate | Cladding layer + base layer + cladding layer | 15 | 380 | 1150 | 1150 | 920 |

| Ex. | Coiling temperature/ °C. | Hot-rolled plate thickness/ mm | Thickness of corrosion resistant cladding layer of hot-rolled plate/μm | Cold rolling annealing temperature/ °C. | Cold-rolled plate thickness/ mm | Thickness of corrosion resistant cladding layer of cold-rolled plate/μm |
|---|---|---|---|---|---|---|
| 1 | 600 | 4 | 50 | 700 | 1 | 12 |
| 2 | 650 | 3.5 | 40 | — | — | — |
| 3 | 550 | 4 | 70 | 750 | 2 | 20 |
| 4 | 600 | 4 | 50 | 700 | 1 | 12 |
| 5 | 640 | 3.5 | 40 | — | — | — |
| 6 | 550 | 2 | 80 | 600 | 0.5 | 20 | disclosure over the prior art, Examples 1-6 of the high-corrosion-resistant strip steel in the present disclosure were tested. The test results are listed in Table 3.

TABLE 3

| Ex. | Yield strength (MPa) | Tensile strength (MPa) | Elongation (%) | Structure (carbon steel base layer + transition layer + corrosion-resistant layer) |
|---|---|---|---|---|
| 1 | 472 | 611 | 35.8 | carbon steel base layer: ferrite + pearlite<br>transition layer: ferrite + pearlite<br>corrosion-resistant layer: austenite |
| 2 | 507 | 649 | 36.0 | carbon steel base layer: ferrite + pearlite<br>transition layer: ferrite + pearlite<br>corrosion-resistant layer: austenite |
| 3 | 480 | 650 | 40.0 | carbon steel base layer: ferrite + pearlite<br>transition layer: ferrite + pearlite<br>corrosion-resistant layer: austenite |
| 4 | 482 | 638 | 38.0 | carbon steel base layer: ferrite + pearlite<br>transition layer: ferrite + pearlite<br>corrosion-resistant layer: austenite |
| 5 | 482 | 635 | 39.0 | carbon steel base layer: ferrite + pearlite<br>transition layer: ferrite + pearlite<br>corrosion-resistant layer: austenite |
| 6 | 382 | 535 | 30.0 | carbon steel base layer: ferrite + pearlite<br>transition layer: ferrite + pearlite<br>corrosion-resistant layer: α-Ti |

FIG. 1 schematically shows the structure of the high-corrosion-resistant strip steel according to the present disclosure in some embodiments.

As shown in FIG. 1, in these embodiments, the high-corrosion-resistant strip steel comprises a carbon steel base layer 1 and corrosion-resistant cladding layers 2 roll-bonded to the upper and lower surfaces of the carbon steel base layer 1. The corrosion-resistant cladding layers 2 may be austenitic stainless steel or pure titanium, and the thickness of the corrosion-resistant cladding layers is 0.5-5% of the total thickness of the strip steel.

Figure 2:
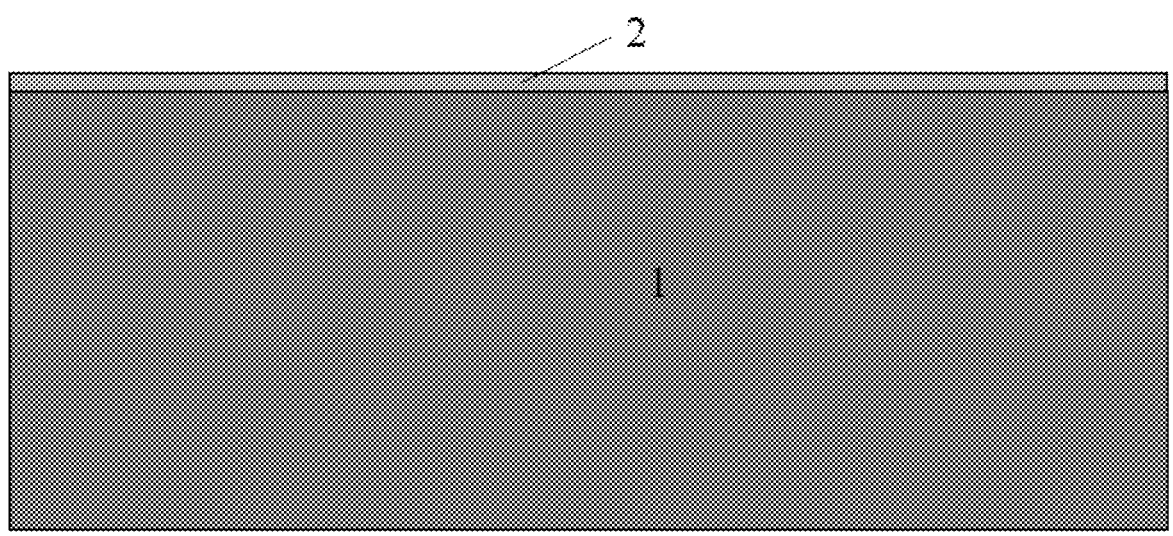
FIG. 2 schematically shows the structure of the high-corrosion-resistant strip steel according to the present disclosure in some other embodiments.

FIG. 2 schematically shows the structure of the high-corrosion-resistant strip steel according to the present disclosure in some other embodiments.

As shown in FIG. 2, in these embodiments, the high-corrosion-resistant strip steel comprises a carbon steel base layer 1 and a corrosion-resistant cladding layer 2 roll-bonded to the upper surface of the carbon steel base layer 1 (of course, in some other embodiments, a corrosion-resistant cladding layer 2 may also be roll-bonded to the lower surface of the carbon steel base layer 1). The corrosion-resistant cladding layer 2 may be austenitic stainless steel or pure titanium, and the thickness of the corrosion-resistant cladding layer is 0.5-5% of the total thickness of the strip steel.

Figure 3:
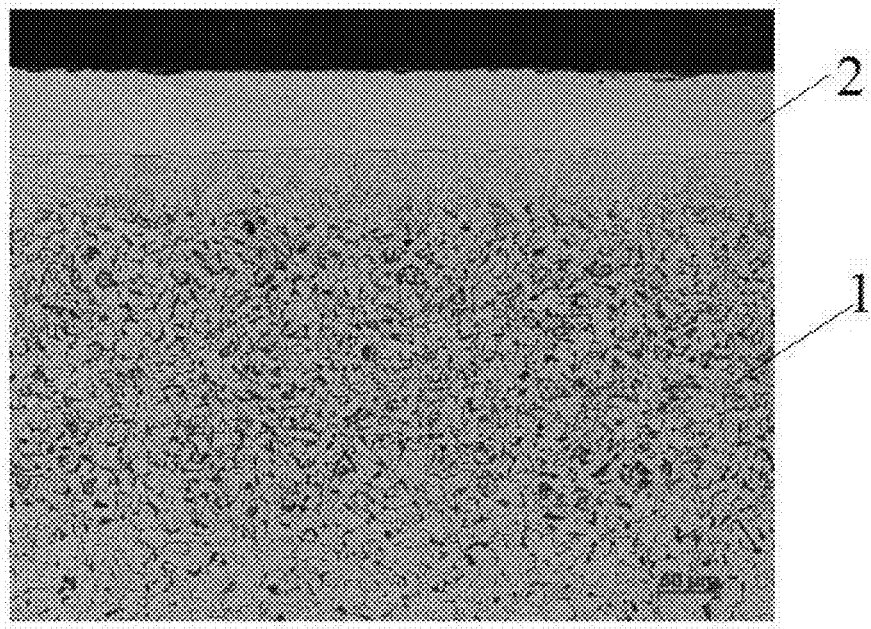
FIG. 3 is a photograph showing a typical tissue at the upper surface of the high corrosion resistant strip steel in Example 1.
Figure 4:
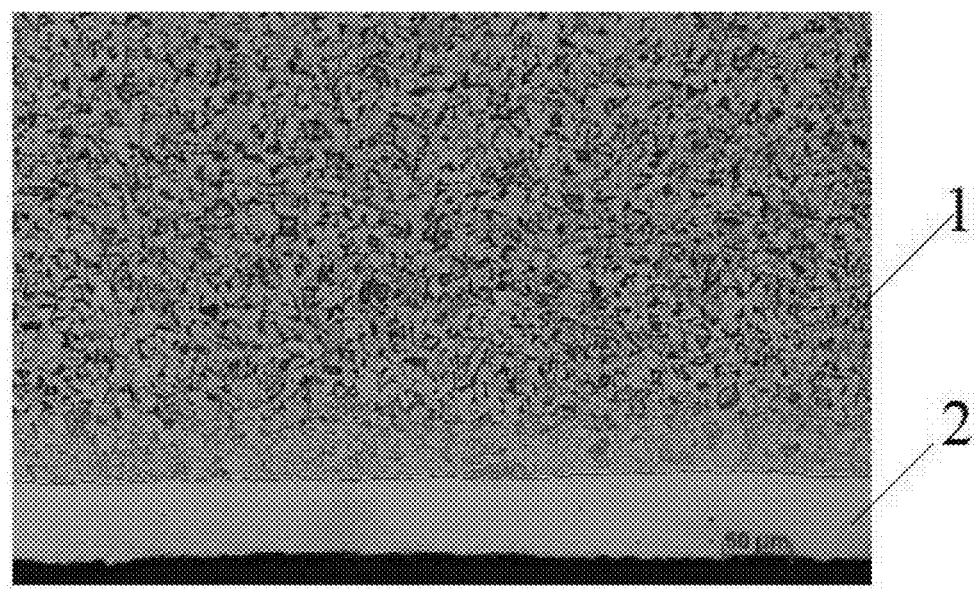
FIG. 4 is a photograph showing a typical tissue at the lower surface of the high corrosion resistant strip steel in Example 1.

FIG. 3 is a photograph showing a typical tissue at the top surface of the high corrosion resistant strip steel in Example 1. FIG. 4 is a photograph showing a typical tissue at the lower surface of the high corrosion resistant strip steel in Example 1.

As can be seen from FIG. 3 and FIG. 4, in the high-corrosion-resistant strip steel of Example 1, the microstructure of the carbon steel base layer 1 is ferrite and pearlite. The corrosion-resistant cladding layer 2 is an austenitic stainless steel corrosion-resistant cladding layer, and the microstructure of the corrosion-resistant cladding layer 2 is austenite. The transition layer between the carbon steel base layer 1 and the corrosion-resistant cladding layer 2 is ferrite and pearlite.

Figure 5:
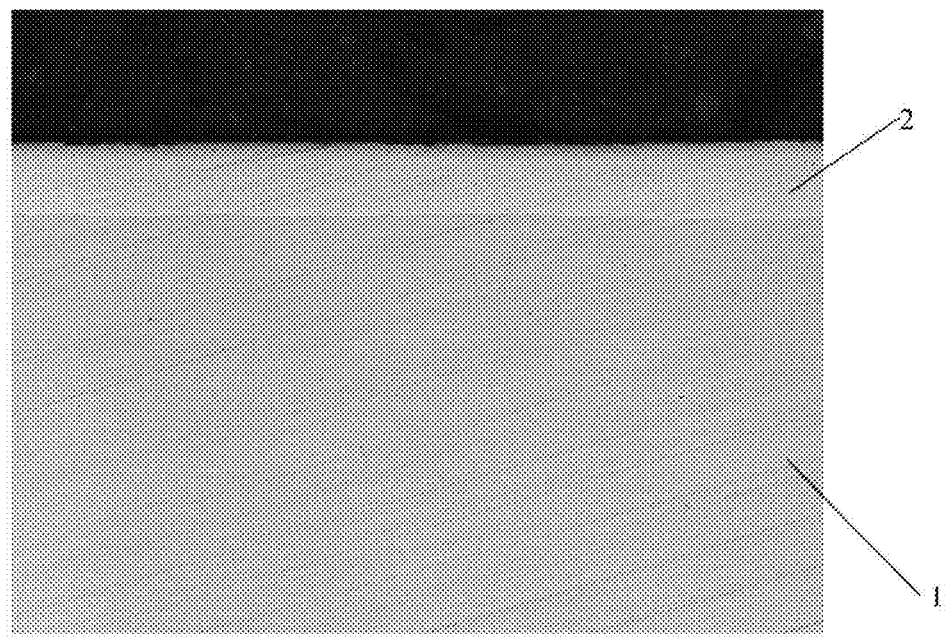
FIG. 5 is a photograph showing a typical tissue of the high corrosion resistant strip steel in Example 2.

FIG. 5 is a photograph showing a typical tissue of the high corrosion resistant strip steel in Example 2.

As can be seen from FIG. 5, in the high-corrosion-resistant strip steel of Example 2, the microstructure of the carbon steel base layer 1 is ferrite and pearlite. The corrosion-resistant cladding layer 2 is an austenitic stainless steel corrosion-resistant cladding layer, and the microstructure of the corrosion-resistant cladding layer 2 is austenite. The transition layer between the carbon steel base layer 1 and the corrosion-resistant cladding layer 2 is ferrite and pearlite. It should be noted that, as can be seen from FIG. 5, the thickness of the high-corrosion-resistant strip steel of Example 2 is 3.5 mm, and the thickness of the corrosion-resistant cladding layer 2 is 40

Figure 6:
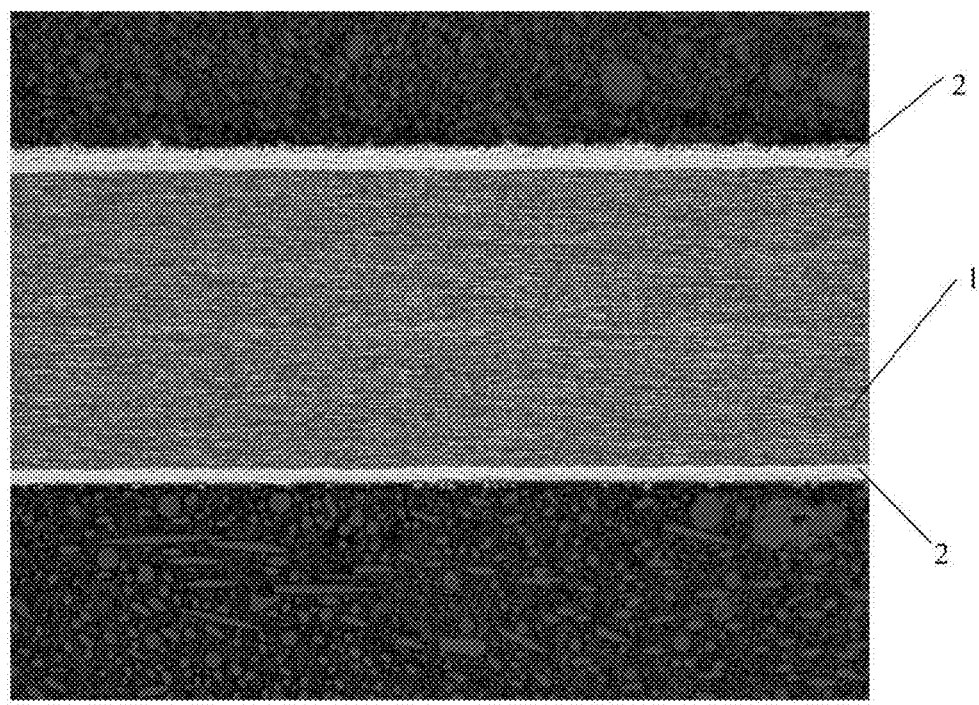
FIG. 6 is a photograph showing a typical tissue of the high corrosion resistant strip steel in Example 6.

FIG. 6 is a photograph showing a typical tissue of the high corrosion resistant strip steel in Example 6.

As can be seen from FIG. 6, in the high-corrosion-resistant strip steel of Example 6, the microstructure of the carbon steel base layer 1 is ferrite and pearlite. The corrosion-resistant cladding layer 2 is a pure titanium corrosion-resistant cladding layer, and its microstructure is α-Ti. The transition layer between the carbon steel base layer 1 and the corrosion-resistant cladding layer 2 is ferrite and pearlite. The thickness of the high-corrosion-resistant strip steel of Example 6 is 0.5 mm, and the thickness of each corrosion-resistant cladding layer 2 is 20 μm.

To sum up, high-corrosion-resistant strip steel according to the present disclosure is provided with a corrosion-resistant cladding layer and a carbon steel base layer having proper thicknesses, so that a strip having high corrosion resistance and good mechanical properties is obtained.

In some embodiments, a transition layer structure of a certain thickness is formed between the corrosion-resistant cladding layer and the carbon steel base layer, so that complete metallurgical bonding of the corrosion-resistant cladding layer and the carbon steel base layer is achieved extremely well. While the corrosion resistance and the mechanical properties are guaranteed, the applicability and economy of the material are promoted. The essential sore point with the existing carbon steel materials can be addressed. The corrosion resistance, bonding strength and durability achieved according to the present disclosure are not possible for the existing coated plate products. The high-corrosion-resistant strip steel according to the present disclosure is more energy-saving, environment-friendly and maintenance-free, and has important significance and promising prospects.

In addition, the manufacturing method according to the present disclosure also has the above advantages and beneficial effects.

It's to be noted that the prior art portions in the protection scope of the present disclosure are not limited to the examples set forth in the present disclosure file. All the prior art contents not contradictory to the technical solution of the present disclosure, including but not limited to prior patent literature, prior publications, prior public uses and the like, may all be incorporated into the protection scope of the present disclosure.

In addition, the ways in which the various technical features of the present disclosure are combined are not limited to the ways recited in the claims of the present disclosure or the ways described in the specific examples. All the technical features recited in the present disclosure may be combined or integrated freely in any manner, unless contradictions are resulted.

It should also be noted that the Examples set forth above are only specific examples according to the present disclosure. Obviously, the present disclosure is not limited to the above Examples. Similar variations or modifications made thereto can be directly derived or easily contemplated from the present disclosure by those skilled in the art. They all fall in the protection scope of the present disclosure.

What is claimed is:

1. A corrosion-resistant cold-rolled strip steel, comprising a carbon steel base layer, a corrosion-resistant cladding layer roll-bonded to the carbon steel base layer, and a transition layer between the carbon steel base layer and the corrosion-resistant cladding layer, wherein the carbon steel base layer comprises the following chemical elements in mass percentage: C: 0.01-0.20%; Si: 0.10-0.5%; Mn: 0.5-2.0%; Al: 0.02-0.04%; Ti: 0.005-0.018%; Nb: 0.005-0.020%; and a balance of Fe and unavoidable impurities, wherein the corrosion-resistant cladding layer is austenitic stainless steel or pure titanium, and the corrosion-resistant cladding layer has a thickness that is 0.5-5% of a total thickness of the strip steel, and wherein the carbon steel base layer has a microstructure of ferrite and pearlite, the austenitic stainless steel has a microstructure of austenite, and the transition layer has a microstructure of pearlite and ferrite, and wherein the thickness of the cold-rolled strip is 0.5-2 mm and the thickness of the corrosion-resistant cladding layer is 12-20 μm.

2. The corrosion-resistant cold-rolled strip steel according to claim 1, wherein amounts of C, Si, Mn, Al, Ti and Nb meet at least one of:
   C: 0.01-0.18%;
   Si: 0.10-0.3%;
   Mn: 0.5-1.5%;
   Al: 0.02-0.03%;
   Ti: 0.005-0.015%;
   Nb: 0.005-0.015%.

3. The corrosion-resistant cold-rolled strip steel according to claim 1, further comprising at least one of the following chemical elements: $0<B\leq0.0003\%$; $0<N\leq0.006\%$; $0<Ni\leq0.20\%$; $0<Cr\leq0.20\%$; $0<Mo\leq0.10\%$; $0<Sb\leq0.30\%$; $0<V\leq0.30\%$; $0<W\leq0.30\%$; $0<Cu\leq0.30\%$; $0<Sn\leq0.30\%$; $0<Bi\leq0.30\%$; $0<Se\leq0.30\%$; $0<Te\leq0.30\%$; $0<Ge\leq0.30\%$; $0<As\leq0.30\%$; $0<Ca\leq0.30\%$; $0<Mg\leq0.30\%$; $0<Zr\leq0.30\%$; $0<Hf\leq0.30\%$; $0<$rare earth elements$\leq0.50\%$.

4. The corrosion-resistant cold-rolled strip steel according to claim 1, wherein among the unavoidable impurities: $P\leq0.015\%$; and/or $S\leq0.010\%$.

5. The corrosion-resistant cold-rolled strip steel according to claim 1, wherein the carbon steel base layer in the corrosion-resistant strip steel comprises chemical elements in percentage by mass of: C: 0.01-0.20%; Si: 0.10-0.5%; Mn: 0.5-2.0%; Al: 0.02-0.04%; Ti: 0.005-0.018%; Nb: 0.005-0.020%; N: $0<N\leq0.006\%$; Mo: $\leq0.10\%$; Cr: $\leq0.20\%$; Ni: $\leq0.20\%$; and a balance of Fe and unavoidable impurities.

6. The corrosion-resistant cold-rolled strip steel according to claim 1, wherein the corrosion-resistant strip steel has a tensile strength of ≥500 MPa, a yield strength of 370-510 MPa, and an elongation of ≥30%.

7. A manufacture method for the corrosion-resistant cold-rolled strip steel according to claim 1, comprising steps:
   (1) Providing a carbon steel base layer as a base material and a corrosion-resistant cladding layer as a cladding material;
   (2) Assembling a slab;
   (3) Pre-heating: pre-heating the slab at a temperature of 1150-1250° C. to diffuse elements of the corrosion-resistant cladding layer and the carbon steel base layer at an interface to form a stable transition layer, and then slowly cooling to room temperature;
   (4) Secondary heating and rolling: performing secondary heating at a temperature of 1100-1200° C., and then performing multi-pass rolling, wherein a finish rolling temperature is controlled to be not lower than 900° C.; and
   (5) Coiling after water cooling.

8. The manufacture method according to claim 7, wherein in the step (4), a total rolling reduction ratio is controlled to be not lower than 70%.

9. The manufacture method according to claim 7, wherein in the step (4), the finish rolling temperature is controlled to be 920-1000° C.

10. The manufacture method according to claim 7, wherein in the step (5), a coiling temperature is controlled to be 500-650° C.

11. The manufacture method according to claim 7, further comprising a surface treatment step or a cold rolling step after step (5).

12. The manufacture method according to claim 11, wherein the surface treatment step comprises acid pickling or mechanical descaling, and a cold rolling annealing temperature in the cold rolling step is controlled to be 600-750° C.

13. The manufacture method according to claim 7, wherein in step (1), each layer of cladding material has a thickness of 5-20 mm, and the base material has a thickness of 300-370 mm.

14. The manufacture method according to claim 7, wherein amounts of C, Si, Mn, Al, Ti and Nb meet at least one of:
   C: 0.01-0.18%;
   Si: 0.10-0.3%;
   Mn: 0.5-1.5%;
   Al: 0.02-0.03%;
   Ti: 0.005-0.015%;
   Nb: 0.005-0.015%.

15. The manufacture method according to claim 7, further comprising at least one of the following chemical elements: $0<B\leq0.0003\%$; $0<N\leq0.006\%$; $0<Ni\leq0.20\%$; $0<Cr\leq0.20\%$; $0<Mo\leq0.10\%$; $0<Sb\leq0.30\%$; $0<V\leq0.30\%$; $0<W\leq0.30\%$; $0<Cu\leq0.30\%$; $0<Sn\leq0.30\%$; $0<Bi\leq0.30\%$; $0<Se\leq0.30\%$; $0<Te\leq0.30\%$; $0<Ge\leq0.30\%$; $0<As\leq0.30\%$; $0<Ca\leq0.30\%$; $0<Mg\leq0.30\%$; $0<Zr\leq0.30\%$; $0<Hf\leq0.30\%$; $0<$rare earth elements$\leq0.50\%$.

16. The manufacture method according to claim 7, wherein the carbon steel base layer in the corrosion-resistant strip steel comprises chemical elements in percentage by mass of: C: 0.01-0.20%; Si: 0.10-0.5%; Mn: 0.5-2.0%; Al: 0.02-0.04%; Ti: 0.005-0.018%; Nb: 0.005-0.020%; N: 0<N≤0.006%; Mo: ≤0.10%; Cr: ≤0.20%; Ni: ≤0.20%; and a balance of Fe and other unavoidable impurities.

17. The manufacture method according to claim 7, wherein the corrosion-resistant strip steel has a tensile strength of ≥500 MPa, a yield strength of 370-510 MPa, and an elongation of ≥30%.

* * * * *